US012227987B2

(12) United States Patent
Deiss

(10) Patent No.: US 12,227,987 B2
(45) **Date of Patent: *Feb. 18, 2025**

(54) SEALING TAPE

(71) Applicant: ISO-Chemie GmbH, Aalen (DE)

(72) Inventor: Martin Deiss, Abtsgmuend (DE)

(73) Assignee: ISO-Chemie GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,040

(22) Filed: Aug. 21, 2023

(65) Prior Publication Data

US 2023/0392432 A1 Dec. 7, 2023

Related U.S. Application Data

(63) Continuation of application No. 17/100,634, filed on Nov. 20, 2020, now Pat. No. 11,773,639.

(30) Foreign Application Priority Data

Nov. 22, 2019 (EP) .................................. 19 210 892

(51) Int. Cl.

| | |
|---|---|
| ***E06B 1/62*** | (2006.01) |
| ***E04B 1/68*** | (2006.01) |
| ***E06B 7/23*** | (2006.01) |

(52) U.S. Cl.

CPC .............. *E06B 1/62* (2013.01); *E04B 1/6812* (2013.01); *E06B 7/23* (2013.01); *E06B 2001/626* (2013.01)

(58) Field of Classification Search

None

See application file for complete search history.

(56) References Cited

U.S. PATENT DOCUMENTS

| | | | |
|---|---|---|---|
| 2,431,384 | A | 11/1947 | Fischer |
| 3,461,781 | A | 8/1969 | Weiner |
| 4,740,256 | A | 4/1988 | Vosberg |
| 5,277,954 | A | 1/1994 | Carpenter |

(Continued)

FOREIGN PATENT DOCUMENTS

| | | | |
|---|---|---|---|
| DE | 102016114227 | A1 | 2/2018 |
| EP | 0 323 589 | A2 | 7/1989 |

(Continued)

OTHER PUBLICATIONS

EP 19 21 0892 Search Report dated May 14, 2020.

*Primary Examiner* — Phi D A

(74) *Attorney, Agent, or Firm* — Jansson Munger & McKinley Ltd.

(57) ABSTRACT

The sealing tape includes at least one base body of flexible foam capable of recovery after compression. In the area of the bottom surface of the sealing tape, an adhesive layer for bonding to a frame profile of a window or door is arranged. The sealing tape has a continuous barrier structure for reducing the permeability to the diffusion of water vapor and/or the permeability to air in the functional direction of the sealing tape, the barrier structure extends from the top surface to the bottom surface and also extends over an area of the top surface. The barrier structure includes, at least in the area of the top surface, a closed-cell flexible foam or consists of closed-cell flexible foam. The barrier structure, at least in the area of the top surface of the sealing tape, has a thickness of between 10 μm and 5 mm.

14 Claims, 7 Drawing Sheets

(56) References Cited

U.S. PATENT DOCUMENTS

| | | | | |
|---|---|---|---|---|
| 8,541,084 | B2 | 9/2013 | Deiss | |
| 10,323,409 | B1 * | 6/2019 | Robinson | E01C 11/106 |
| 10,794,055 | B1 * | 10/2020 | Robinson | E04B 1/61 |
| 11,242,709 | B1 * | 2/2022 | Hay, III | E06B 1/62 |
| 2010/0003465 | A1 | 1/2010 | Deiss | |
| 2010/0009118 | A1 | 1/2010 | Deiss | |
| 2011/0135387 | A1 | 6/2011 | Derrigan | |
| 2011/0143121 | A1 * | 6/2011 | Deiss | E04B 1/6812 428/317.1 |
| 2013/0187348 | A1 | 7/2013 | Deiss | |
| 2014/0151968 | A1 * | 6/2014 | Hensley | F16J 15/022 277/654 |
| 2014/0219719 | A1 * | 8/2014 | Hensley | E01C 11/14 404/57 |
| 2014/0360118 | A1 | 12/2014 | Hensley | |
| 2016/0060863 | A1 * | 3/2016 | Deiss | E04B 1/6812 428/58 |
| 2018/0202147 | A1 | 7/2018 | Klein | |
| 2019/0323347 | A1 * | 10/2019 | Hensley | E21D 11/385 |
| 2020/0063433 | A1 | 2/2020 | Garcia | |
| 2020/0347590 | A1 * | 11/2020 | Robinson | E04B 1/6812 |
| 2022/0034081 | A1 * | 2/2022 | Birkelbach | E02D 29/16 |

FOREIGN PATENT DOCUMENTS

| | | | |
|---|---|---|---|
| EP | 2 107 176 | A1 | 10/2009 |
| EP | 2 415 942 | A1 | 2/2012 |
| EP | 3 375 597 | A2 | 9/2018 |
| EP | 3 425 132 | A1 | 1/2019 |

* cited by examiner

SEALING TAPE

RELATED APPLICATIONS

This application is a continuation of U.S. Ser. No. 17/100,634, filed Nov. 20, 2020, which claims priority to European Patent Application No. EP 19 210 892.6, filed on Nov. 22, 2019. The entire disclosure and contents of these applications are incorporated by reference into the present application.

FIELD OF THE INVENTION

The present invention relates to a sealing tape with at least one base body of flexible foam capable of recovery after compression.

In general, sealing tapes serve to seal joints between structural components, especially between the frame profiles of windows or doors and the wall of a building.

An example of this type of sealing tape is known from EP 3 513 954 A1. The sealing tape comprises a foam carrier, into which cuts proceeding in alternation from the top surface and from the bottom surface are made. A film strip, an adhesive tape strip, or an adhesive-like medium is introduced into each of these cuts to form a barrier layer, which extends over part of the thickness of the sealing tape between its top and bottom surfaces. A section of each barrier layer is also arranged on the associated top or bottom surface of the sealing tape. Because a film, an adhesive strip, or a cured adhesive have insufficient flexibility, however, it is possible for air channels and/or water vapor diffusion channels to form between the sealing tape and the rough surface of the adjacent building wall. In that case it cannot be guaranteed that the sealing tape will have the desired sealing properties or the properties required by the associated regulations. Because of the many cuts which have to be made into the foam carrier from both sides and because of the need to insert the barrier layer components into the foam carrier, furthermore, it is also extremely laborious to manufacture a sealing tape in this manner.

SUMMARY OF THE INVENTION

It is an object of the present invention to provide a sealing tape which can be produced easily and at low cost and which can reliably provide the intended sealing properties.

According to an aspect of the invention, the sealing tape comprises at least one base body of flexible foam capable of recovery after compression, wherein the sealing tape comprises a top surface, a bottom surface, and a first and a second side surface, which connect the top surface and the bottom surface to each other, wherein the side surfaces are substantially perpendicular to a functional direction of the sealing tape. An adhesive layer is arranged in the area of the bottom surface, so that the sealing tape can be adhered to a building component, in particular to the frame profile of a window or door. The sealing tape comprises a continuous barrier structure to reduce the permeability to water vapor diffusion and/or the permeability to air in the functional direction, wherein the barrier structure extends from the top surface of the sealing tape to the bottom surface of the at least one base body. The barrier structure also extends over a certain area of the top surface of the sealing tape and, at least on that surface, comprises a closed-cell foam or consists of such foam. At least in the area of the top surface of the sealing tape, the barrier structure comprises a thickness in the range between 10 μm and 5 mm.

A sealing tape is thus provided which can be produced easily and at low cost and which guarantees a reliable seal. That the barrier structure comprises a closed-cell foam at least on the top surface of the sealing tape offers the advantage that the flexible foam conforms with especially good elasticity to the building wall, and therefore the formation of air channels and/or water vapor diffusion channels between the sealing tape and the building wall in the functional direction is avoided.

Through the selection of a suitable material for the barrier structure, the sealing properties of the sealing tape with respect to the water vapor diffusion permeability and/or the air permeability of the sealing tape can be effectively adjusted. Thus the functionality of the sealing tape is expanded.

The barrier layer can be provided as a liner on the at least one base body, for example, or it can be laminated to the base body; methods for joining two foam elements together are familiar to the skilled person.

The ability of the barrier structure to rest as tightly as possible against the wall and thus the sealing action of the sealing tape are influenced by the material properties of the barrier structure and can thus be improved by proper selection of those properties.

In a preferred embodiment, therefore, the closed-cell foam of the barrier structure is formed out of polyurethane, polyethylene, polyvinyl chloride, polyolefin, or polypropylene and has a density of between 15 and 200 kg/m$^3$.

The closed-cell foam of the barrier structure preferably has a compression hardness of between 2 kPa and 15 kPa, more preferably of between 2.1 kPa and 10 kPa, and even more preferably of between 2.2 kPa and 5 kPa, relative to a compression of 40% versus the original thickness (CV40) according to DIN EN ISO 3386:2015.

The term "closed-cell foam" is used within the scope of this application to mean a flexible foam comprising a high percentage of closed cells or of cells with only a small open cross section. A closed-cell foam is characterized exclusively by the indication of its air permeability. The air permeability of the closed-cell foam in the preferred embodiments is no more than 50 l/(m$^2$/s), more preferably no more than 40 l/(m$^2$/s), even more preferably no more than 30 l/(m$^2$/s), and especially preferably no more than 20 l/(m$^2$/s), measured according to DIN EN ISO 9237:1995 with a test area of 100 cm$^2$ at a measurement pressure (negative pressure) of 1.0 mbar by a model 21443 Frank test device.

The barrier structure preferably also comprises, at least in the area of the top surface of the sealing tape, a thickness in the range between 15 μm and 3 mm, preferably between 50 m and 2 mm.

The barrier structure extends continuously between a top surface of the at least one base body and a bottom surface of the at least one base body to bring about the desired seal over the entire cross section of the at least one foam base body.

In general, the at least one base body has the same orientation as the sealing tape, i.e., the top surface of the at least one base body is arranged in the area of the top surface of the sealing tape and is preferably parallel to it, and the bottom surface of the at least one base body is arranged in the area of the bottom surface of the sealing tape and is preferably parallel to it. If no additional component of the sealing tape is arranged on the top or bottom surface of the at least one base body, this surface itself then forms the top or bottom surface of the sealing tape. If, however, an additional component of the sealing tape such as a barrier layer or an adhesive layer is arranged on the top or bottom surface of the at least one base body, then the surface of this component which is facing away from the other components in question forms the top surface or bottom surface of the sealing tape in this area.

In the area of the top surface of the sealing tape, the barrier structure extends along the top surface of the at least one base body and thus forms the top surface of the sealing tape in this area. At least in the area of the top surface, the barrier structure is preferably permanently bonded to the at least one base body, i.e., by an adhesive or by lamination.

In one embodiment, the barrier structure on the top surface of the sealing tape extends over at least 2% of the width of the sealing tape, preferably over at least 10% of the width of the sealing tape, and more preferably over the entire width of the sealing tape, i.e., from the first side surface to the second side surface.

In general, the width of the sealing tape is defined as the distance between the side surfaces of the sealing tape in a direction parallel to the functional direction.

At the bottom surface of the at least one base body, the barrier structure can meet the adhesive layer, which optionally can be part of the barrier structure. The barrier structure can end upon reaching the bottom surface of the at least one base body, where it can, for example, meet the adhesive layer.

The barrier structure, however, can also extend along the bottom surface of the at least one base body. In a preferred embodiment, the barrier structure extends along the bottom surface of the at least one base body and over at least 1% of the width of the sealing tape, more preferably over at least 5% of the width of the sealing tape, and even more preferably over the entire width of the sealing tape, i.e., from the first side surface to the second side surface.

The barrier structure preferably extends along the top surface to an area between the first and second side surfaces and then proceeds from the top surface to the bottom surface of the sealing tape. Sensitive parts of the barrier structure are thus protected from the damage which might be caused by external influences during transport or handling, because parts of the at least one base body of flexible foam are arranged on both sides of the section of the barrier structure extending from the top surface to the bottom surface.

More preferably, the barrier structure then extends along the bottom surface of the at least one base body from the area between the first and second side surfaces toward at least one of the side surfaces, i.e., to the first or second side surface.

In one embodiment, the barrier structure on the top surface begins from at least one, i.e., the first or second, side surface and proceeds to the area between the first and second side surfaces, from which it then extends along the bottom surface of the at least one base body from the area between the first and second side surface to at least one, i.e., first or second, side surface.

The barrier structure preferably lines up precisely with the side surfaces of the sealing tape. In many embodiments, however, the barrier structure can also begin or end a slight distance away from the side surfaces.

In one embodiment, the barrier structure on the top surface begins from the first side surface and proceeds to the area between the first and second side surfaces, from which it then proceeds from the top surface to the bottom surface of the sealing tape and finally extends along the bottom surface of the at least one base body from the area between the first and second side surfaces to the second side surface. As a result, a continuous barrier structure can be formed, and at the same time the required amount of barrier structure material can be reduced, because this material needs to be provided only in certain areas and does not have to extend over the entire width of the sealing tape on the top surface of the sealing tape or over the entire width along the bottom surface of the sealing tape.

In another embodiment, these advantages can also be achieved in that the barrier structure on the top surface begins from the first side surface and proceeds to the area between the first and second side surfaces, from which it then proceeds from the top surface to the bottom surface of the sealing tape and finally extends along the bottom surface of the at least one base body from the area between the first and second side surfaces to the first side surface. The variety of possible embodiments and production variants is thus also increased, which means that the sealing tape can be adapted more easily to the requirements of a specific situation.

The sealing tape according to the invention can be produced especially easily in another embodiment, in which the barrier structure on the top surface begins from the first and second side surfaces and proceeds to the area between the first and second side surfaces, from which it then proceeds from the top surface to the bottom surface of the sealing tape and finally extends along the bottom surface of the at least one base body from the area between the first and second side surfaces to the first side surface and to the second side surface.

Embodiments are also conceivable in which the barrier structure on the top surface begins from the first and second side surfaces and proceeds to the area between the first and second side surfaces, from which it then proceeds along the bottom surface of the at least one base body from the area between the first and second side surfaces only to the first or only to the second side surface. Alternatively, the barrier structure on the top surface can begin only from the first or only from the second side surface and proceed to the area between the first and second side surfaces, from which it then proceeds along the bottom surface of the at least one base body from the area between the first and second side surfaces to the first and to the second side surface.

The top surface of the sealing tape preferably comprises a profile with at least one valley, such that the sealing tape, in a fully expanded state, comprises a first thickness in the area of the first side surface, a second thickness in the area of the second side surface, and a third thickness in the area between the first and second side surfaces which is less than the first thickness and less than the second thickness. In the fully expanded state of the sealing tape, the interior space of the valley is filled exclusively with air. The barrier structure now proceeds from the top surface to the bottom surface in such a way that it extends through the area of the third thickness. The sealing tape thus formed can be produced especially easily and cheaply. The air-filled valley, furthermore, has a positive effect on, for example, the thermal insulation achievable by the sealing tape.

The interior space of the valley is defined here as the space which is bounded by a curved section of the top surface of the sealing tape in the area of the valley and an imaginary extension, proceeding over the curved area, of a flat section of the top surface of the sealing tape near a side surface.

The thickness of the sealing tape is defined in a direction which extends between the top surface and the bottom surface of the sealing tape and which is perpendicular to the functional direction of the sealing tape and which is preferably parallel to the side surfaces.

In a preferred embodiment, the first and second thicknesses are substantially the same. As a result, the pressure exerted by the sealing tape on the building wall is the same along both side surfaces.

In a preferred embodiment, the third thickness is between 2 and 95%, more preferably between 3 and 80%, even more preferably between 5 and 50% of the first thickness.

In all embodiments, the first thickness and/or the second thickness of the sealing tape in the fully expanded state is preferably between 5 and 150 mm, more preferably between 10 and 100 mm.

In all embodiments, the third thickness of the sealing tape in the fully expanded state is preferably between 1 and 142 mm, more preferably between 2 and 95 mm.

In a preferred embodiment of the sealing tape, the area of the third thickness is arranged substantially in the middle between the two side surfaces.

The valley preferably extends over an area of 2-60%, more preferably over an area of 5-40%, of the entire width of the sealing tape.

The width of the sealing tape in all embodiments is preferably between 10 and 500 mm, more preferably between 10 and 150 mm.

A bottom of the at least one base body can, in the fully expanded state of the sealing tape, be flat. In the fully expanded state of the sealing tape, the bottom of the at least one base body can also, however, comprise a profile with a bottom valley, which is oriented toward the top surface of the sealing tape and which is opposite the valley in the top surface in the area of the third thickness.

In the fully expanded state of the sealing tape, the adhesive layer can then comprise a profile with the shape of a hill and thus conform substantially to the shape of the bottom valley. In the latter case, the adhesive layer is preferably adhered substantially continuously along the bottom surface of the sealing tape to adjacent areas of the sealing tape.

Independently of the profile of the bottom of the at least one base body, in certain embodiments the adhesive layer, in the fully expanded state of the sealing tape, will be flat. In this case, it can be effective for the adhesive layer to be adhered at its top surface to the adjacent areas of the sealing tape only in areas adjacent to the side surfaces of the sealing tape. It is conceivable that the adhesive layer could have adhesive properties in the upward direction only in the areas in which it comes in contact with areas of the sealing tape. The adhesive layer can, for example, be applied to the sealing tape afterwards, as a separate strip.

In all cases, the adhesive layer is preferably configured as a double-sided adhesive tape. In general, the adhesive surface of the adhesive layer serving to attach the sealing tape to the building component is oriented downward, i.e., facing away from the base bodies, and can be covered by a peel-off film or peel-off paper, which can be removed before use.

The lesser third thickness in the fully expanded state of the sealing tape is preferably achieved at least in part by a permanent compression and/or fusion of the foam of at least one base body. Although not absolutely necessary, it is then especially preferred that the barrier structure be formed in part by a permanently compressed and/or fused section of the at least one base body. Part of the barrier structure can therefore be easily produced during the process of compression/fusion. As a result of the compression/fusion of the at least one base body, not only is the desired surface profile of the sealing tape produced but also an additional sealing action is obtained.

Each of the above-described embodiments can comprise precisely one, preferably integral, base body of flexible foam. The embodiments can also, however, comprise two or more base bodies, which are arranged next to each other in the functional direction of the sealing tape. Independently of the number of base bodies, the sealing tape can also comprise several lower and/or upper valleys, which are arranged next to each other in the functional direction.

In a preferred embodiment, the sealing tape comprises at least two base bodies of flexible foam, which are arranged next to each other in the functional direction of the sealing tape, wherein the barrier structure, in a transition area between the two adjacent base bodies, proceeds at least part of the way from the top surface to the bottom surface of the sealing tape.

If the sealing tape has an area with the third thickness, this area is preferably positioned in the transition area between the base bodies. The lesser third thickness can then be achieved by, for example, the permanent compression of one of the base bodies near the transition area to the adjacent base body. Alternatively, the lesser third thickness can also be obtained by a permanent compression of two adjacent base bodies near the transition area between the two base bodies.

The at least two base bodies are preferably configured originally as separate units. As a result, it is possible to form the two base bodies out of different foam materials and therefore to easily influence the sealing and insulating properties of the sealing tape. The two base bodies, however, can also be made out of the same type of foam.

The at least two base bodies can be adhered to each other exclusively via the adhesive layer on the bottom surface. The at least two base bodies, however, are preferably adhered permanently to each other, either additionally or alternatively, in the transition area, e.g., by the barrier structure or an additional adhesive layer between the base bodies. In this way, the sealing tape acquires greater stability. The barrier structure is then preferably formed in part by an adhesive layer of this type. The thickness of such an adhesive layer in the transition area in the fully expanded state of the sealing tape is preferably is 2-80%, more preferably 3-60%, especially preferably 5-50% of the first thickness.

In a preferred embodiment, the barrier structure is configured as a continuous, preferably one-piece, barrier layer, which, on the top surface of the sealing tape, extends along the top surface of at least one of the at least two base bodies, then proceeds from the top surface to the bottom surface of the sealing tape, and finally extends along the bottom surface of at least one of the at least two base bodies. The continuous barrier layer preferably extends from the top surface to the bottom surface of the sealing tape between two adjacent base bodies. For example, the barrier layer can begin from the first or second side surface and then extend along the top surface of a base body to the transition area, from which it then extends along the bottom surface of an adjacent base body from the transition area to the other, i.e., first or second, side surface.

In an alternative embodiment, at least one base body comprises a covering, which surrounds the base body on the top surface, the bottom surface, and a side facing an adjacent base body. It is especially preferred that the covering form a part of the barrier structure or the entire barrier structure.

In one embodiment given by way of example, the sealing tape comprises precisely two base bodies, both of which comprise a corresponding covering.

If it is desired to compress the one base body or the two base bodies near the transition area, this is preferably achieved or supported in each case by the use of the covering. In many embodiments, however, no significant compression of the base bodies near the transition area is provided.

In one possible embodiment, a first leg of at least one base body is bent over by 180° versus a second leg of the base body, wherein the bending site is arranged in the transition area to the other base body. The first and second legs are preferably adhered to each other at their facing surfaces; it is especially preferable that they be adhered by the use of an adhesive or by lamination. In this embodiment as well, the base body in question can comprise a covering, as previously described.

The foam material of a base body of this type is preferably compressed in the area of the bending site by the effect of the bending itself.

In preferred embodiments, the covering comprises substantially closed-cell flexible foam or consists of it. It must be taken into consideration that the barrier structure should comprise a closed-cell flexible foam at least in the area of the top surface of the sealing tape. If, for example, only the covering of a base body forms the barrier structure in the area of the top surface, then this covering must comprise closed-cell flexible foam or consist of such foam. If, however, the sealing tape comprises at least one additional base body with a covering or if the barrier structure comprises additional components in the area of the top surface comprising a closed-cell flexible foam, the covering could then be made of some other material.

Independently of how many base bodies the sealing tape comprises, the barrier structure, in a preferred embodiment, is formed in part by a barrier layer arranged on the top surface of the at least one base body.

The barrier layer arranged on the top surface of the at least one base body preferably comprises substantially closed-cell flexible foam or consists of such foam to guarantee the seal-producing contact of the top surface of the sealing tape with the building wall. Here, too, it must be remembered that at least part of the barrier layer or the entire barrier layer should comprise closed-cell flexible foam in the area of the top surface.

In embodiments with a lesser third thickness, it is also preferred that the barrier layer arranged on the top surface of the at least one base body be permanently compressed and/or fused in the area of the third thickness of the sealing tape. This is advantageous especially in cases where the permanent compression and/or fusion of this barrier layer during the production process occurs jointly with the compression and/or fusion of the material of the base body.

It is also preferred that the barrier structure be formed in part by a barrier layer arranged on the bottom surface of the at least one base body.

This barrier layer can be formed by the adhesive layer arranged in the area of the bottom surface, or it can comprise substantially closed-cell flexible foam or consist of such foam.

Especially in this case but also in other embodiments as well, the barrier structure can be formed in part by the adhesive layer arranged in the area of the bottom surface.

Also in the case of a bottom barrier layer, it is preferred in embodiments with a lesser third height that the barrier layer arranged on the bottom surface of the at least one base body be permanently compressed and/or fused in the area of the third thickness of the sealing tape. This is especially advisable in cases where the compression or fusion carried out during a production step occurs jointly with the compression and/or fusion of the material of the base body and/or the compression and/or fusion of a barrier layer arranged on the top surface of the sealing tape.

The compression and/or fusion of the base body, preferably also the compression and/or fusion of the barrier layer on the top surface, even more preferably also the compression and/or fusion of the barrier layer on the bottom surface, are carried out by adhesive bonding, stitching, lamination, or surface-fusing. In this way, it is possible to arrive at the permanent compression and/or fusion without the need to provide for this purpose additional elements in the area of the valley in the top surface of the sealing tape. All of the above-mentioned methods of compression and/or fusion can be carried out simultaneously, i.e., in a single work step, for all of the individual layers lying on top of each other.

In the fully expanded state of the sealing tape, the thickness of the permanently compressed and/or fused section consisting of all the layers participating in a particular configuration is in general preferably 2-50%, more preferably 3-40%, especially preferably 5-30%, of the first thickness.

In general, the barrier structure can be configured as a one-piece unit and is then preferably formed continuously out of the same material. This can be the case when, for example, a covering of a base body forms the barrier structure or the barrier structure is formed out of a single, continuous barrier layer.

Alternatively, however, the barrier structure can also consist of multiple parts, wherein the individual components are then preferably connected to each other with a seal-producing effect. This can be the case, for example, when the barrier structure is made up of a top barrier layer, a compressed and/or fused section of at least one base body, and a lower barrier layer (optionally formed by the adhesive layer on the bottom surface of the sealing tape). Under certain circumstances, the individual parts of the barrier structure can no longer be distinguished optically from each other after they have been fused together, for example. A continuous barrier layer can also be assembled from several barrier layer sections, e.g., an upper barrier layer, a lower barrier layer, and a barrier layer section connecting the first two.

The barrier structure, preferably formed at least partially by a covering or a barrier layer in the area of the top surface of the sealing tape, can also have a multi-ply configuration. In this case, care must be taken to ensure that at least the side or the layer of the barrier structure facing away from the other components of the sealing tape and thus facing a wall comprises a closed-cell foam or consists of such foam. In other words, the barrier structure, at least in the area in which it forms the top surface of the sealing tape, comprises a closed-cell foam or consists of such foam.

For the purpose of increasing the ease of handling and transport and also of reducing the amount of space required for storage, the sealing tape according to the invention is preferably provided in the form of a sealing tape roll. The sealing tape in the sealing tape roll is in a compressed state, in which the top surface and the bottom surface of the sealing tape extend substantially in a straight line. The sealing tape is wound up into the sealing tape roll in such a way that the bottom surface of the sealing tape of one turn rests against the top surface of the sealing tape of an adjacent turn, and the side surfaces of the sealing tape from the end surfaces of the sealing tape roll. If the top surface and/or the bottom surface of the sealing tape in the fully expanded state has a valley, this will be much less pronounced in the state in which the sealing tape has been wound up into a roll than it is in the fully expanded state.

The degree of compression of the first and/or second side surface in the compressed state on the sealing tape roll is preferably between 3 and 50%, more preferably between 5 and 25%, in comparison to the fully expanded state. The degree of compression designates here the thickness in the compressed state as a percentage of the thickness in the fully expanded state.

In an installed state, the sealing tape is arranged in a section of a building. The building section comprises a wall and a building component inserted into an opening in the wall, wherein the sealing tape is arranged in the joint between the building component and the wall and thus seals the joint. One of the side surfaces of the sealing tape faces the interior of the room, the other the exterior of the room, and the sealing tape is preferably connected to the building component by the adhesive layer in the area of the bottom surface of the sealing tape. In comparison to the uncompressed or fully expanded state of the sealing tape, the sealing tape in the installed state is partially compressed.

In this partially compressed installed state, it is preferable for the top surface of the sealing tape to rest against the wall in the area of the side surfaces of the sealing tape, whereas the top surface of the sealing tape does not rest against the wall at least in the area of the original third thickness, or possibly it rests against the wall in this area, where, however, it exerts a pressure which is less than that present in the area of the side surfaces of the sealing tape. This result is achieved primarily by the lesser third thickness of the sealing tape in the fully expanded state.

The degree of compression of the first and/or second side surface in the partially compressed, installed state is preferably between 5 and 90%, more preferably between 10 and 70%, compared to the fully expanded state. The degree of compression designates here the thickness in the partially compressed state as a percentage of the thickness in the fully expanded state.

The foam of the sealing tape can be made out of any desired open-cell or mixed-cell flexible foam. For example, it can be made of polyurethane, polyethylene, polyvinyl chloride, polyolefin, or polypropylene. The density of flexible foams of this type is between 15 and 200 kg/m$^3$.

The foams described herein can also be configured in such a way that they comprise a skin on an exterior surface. This pertains both to the at least one base body of flexible foam and to the barrier structure which comprises a closed-cell foam or consists of such foam. A skin such as this is an integral part of the foam in question but has better sealing properties than the rest of the foam and can protect the rest of the foam from external influences. For example, the skin can be responsible for making the foam substantially watertight. In spite of this, the foam still has the necessary flexibility to allow the best possible contact with the surface of a wall. A corresponding skin formation on at least one surface, i.e., the top surface, bottom surface, or side surface, of the at least one base body can therefore form optionally a part of the barrier structure. The skin can be produced as early as the production of the foam in question. But the skin can also be formed at a later time, e.g., during the application of additional components, such as during the lamination of the closed-cell foam of the barrier structure to the at least one base body. A skin can be formed especially effectively on foam made of polyurethane.

When several base bodies are present, the individual base bodies of the sealing tape preferably consist of the same material. Alternatively, the individual base bodies can be made of different materials.

It is also possible to arrange more than two base bodies next to each other.

To delay its recovery, the at least one base body is preferably impregnated at least partially, preferably completely, with an impregnation agent. The impregnation agent preferably comprises an acrylate dispersion. In an advantageous embodiment, the acrylate dispersion comprises acrylate polymer particles dispersed in a homogeneous phase. It is especially preferred that the foam of the base body be impregnated with an acrylate dispersion for delayed recovery in a percentage by weight such that the sealing tape, at 20° C. and 50% relative humidity, shows a recovery in less than 24 hours from a degree of compression of the sealing tape of approximately 9-13% to the point at which it closes the joint.

The air permeability of the flexible foam of the at least one base body is preferably between 50 and 1,000 l/(m$^2$ s), more preferably between 60 and 600 l/(m$^2$ s), and especially preferably between 80 and 400 l/(m$^2$ s). All of the data on air permeability given within the scope of this application refer to a determination under the standard conditions according to DIN EN ISO 9237:1995, namely, on the basis of a 10-mm-thick foam piece (fully expanded) at a negative measurement pressure of 1.0 bar, with a test area of 100 cm$^2$, and with the use of a model 21443 Frank test device.

The flexible foam of the at least one base body preferably comprises a compression hardness of more than 2 kPa. The compression hardness is preferably more than 2.1 kPa, more preferably more than 2.2 kPa, especially preferably more than 2.3 kPa. The compression hardness is preferably less than 4 kPa, preferably less than 3.8 kPa, and more preferably less than 3.6 kPa. The compression hardness is a measure of the strength of the foam. The values given here are based on a compression of 40% versus the original thickness. The compression hardness is determined according to DIN EN ISO 3386:2015; the CV40 value is stated.

Under the provision that the barrier structure, at least on an area of the top surface of the sealing tape, comprises a closed-cell foam or consists of such foam, the barrier layers and coverings described herein can also comprise the following materials and properties. The properties and relationships explained in the following for the barrier layer or the covering apply generally to the barrier structure in any of its various embodiments as described herein.

Each barrier layer or covering preferably comprises an substantially closed-cell flexible foam or is made exclusively of such foam. The closed-cell foam is preferably not impregnated.

Each barrier layer or covering described within the scope of this application can also be made of a film-like material or of an adhesive, in particular of a strip of film, a strip of adhesive tape, or an adhesive-like liquid medium.

More concretely, each of the barrier layers or coverings described herein can be made of a film of polyamide, polyurethane, polypropylene, or copolymers thereof. Each barrier layer or covering can also be made of a dispersion adhesive, in particular an acrylate adhesive, or of some other appropriate adhesive material.

In all of the embodiments, each barrier layer or covering can have a multi-ply configuration consisting, for example, of any desired combination of several of the above-mentioned materials. It can also comprise, for example, a membrane layer and/or a layer of nonwoven material. In particular, each barrier layer or covering can be formed as a multi-ply composite layer. At least one layer of at least one additional material can be arranged on one or both sides of the functional layer. The one or both additional layers, each of which covers the functional layer partially or completely, can protect and carry or support the functional layer and increase the stability of the barrier layer or covering. The individual layers can consist of the same or different materials.

The layers arranged on one or both sides can in particular be nonwovens, fabrics, or meshes of inert substances such as polyethylene, polyurethane, polypropylene, polyester, glass fibers, or viscose, possibly also perforated films, especially those of polyethylene, polyurethane, polypropylene, or polyester. The layers can, in general, consist of any appropriate material which is present in the form of layers and which preferably does not have an sD value higher than that of the functional layer. The layers on one or both sides can consist of a dispersion adhesive, especially an acrylate adhesive.

If a top and a bottom barrier layer are present, these can be made of the same material or of different materials. Each barrier layer or covering can also consist of various sections of different materials.

All of the above-mentioned materials for the barrier layer or covering can be applied to the flexible foam of each base body and bonded to it in an especially simple and easy-to-control manner. In addition, these materials are especially effective as barrier structure material, because their sealing properties and be effectively fine-tuned.

Each barrier layer or covering has a thickness of 1 μm to 5 mm, preferably of 10 μm to 3 mm, and especially preferably of 50 μm to 2 mm.

Within the scope of the invention, each barrier layer or covering can, in general, form preferably a continuous, nonporous, and nonperforated layer. The air permeability of each barrier layer or covering is preferably in the range of 0.01-50 $l/(m^2\ s)$, more preferably in the range of 0.01-20 $l/(m^2\ s)$. The air permeability is preferably ≤3-6 $l/(m^2\ s)$ or preferably ≤1-2 $l/(m^2\ s)$ or <0.2-0.5 $l/(m^2\ s)$ or especially preferably ≤0.1-0.3 $l/(m^2\ s)$ as determined according to DIN EN ISO 9237:1995 for a test area of 100 $cm^2$ at a measurement pressure (negative pressure) of 1.0 mbar with a model 21443 Frank test device, or is no longer measurable.

The characteristic value for the resistance of a sealing tape to the diffusion of water vapor is the water vapor diffusion value, the so-called sD value, based on a layer of air with a thickness measured in meters. Each barrier layer or covering preferably has an sD value of 0.02 μm to 100 m, more preferably of 0.1 μm to 25 m, or of 0.2 μm to 15 μm (at 25% relative humidity (RH)). The sD value is tested according to DIN EN ISO 12572:2001. Independently of this or in combination with it, each barrier layer or covering can have an sD value of 0.02 μm to 10 μm or of 0.03 m to 6 μm or of 0.05 μm to 2 μm at 72.5% RH, measured according to DIN EN ISO 12572:2001. For example, the sD value at 25% RH can be in the range of 1-10 m, and at 72.5% RH it can be in the range of 0.1-5 m. Unless otherwise specified in DIN EN ISO 12572:2001, the sD values are based on a temperature of 20° C.

Each barrier layer or covering can also be configured with “humidity-related variability”; that is, its resistance to the diffusion of water vapor changes as a function of the humidity of the environment of the barrier layer.

The following relationships apply to every sealing tape according to the invention. The key factor with respect to the air permeability of a sealing tape section is, in general, the overall reduction of the air stream in one direction over the entire cross section of the sealing tape section. If, for example, in the thickness direction or in the functional direction of the sealing tape, a plurality of barrier structure sections and base bodies are arranged in alternation, the reduction of the air stream through all these barrier structure sections and base bodies is to be taken into account. The air permeability of the overall sealing tape in the functional direction is preferably less than 50 $l/(m^2\ s)$, more preferably less than 40 $l/(m^2\ s)$, more preferably less than 30 $l/(m^2\ s)$, more preferably less than 20 $l/(m^2/s)$, more preferably less than 10 $l/(m^2\ s)$, more preferably less than 5 $l/(m^2\ s)$, under the above-indicated measurement conditions.

In one embodiment, the sealing tape also comprises an additional material, which is applied to surface of the at least one base body and/or to a barrier layer or covering and/or is contained in the impregnation agent of the at least one base body. The additional material can give the sealing tape special properties. Additional materials which can be considered in particular include, for example, materials for fire protection (e.g., expandable graphite, noncombustible solids, $CO_2$ emitters, etc.), insulating materials (e.g., polyurethane foam, resins, sealants, etc.), materials for sealing off against moisture (e.g., hydrophobic or hydrophilic substances, substances which swell on contact with water, etc.), materials for sound damping, materials for controlled venting (e.g., catalysts, etc.), materials for hygienic purposes (e.g., disinfectants, etc.), and/or materials for initiating the expansion of the sealing tape (e.g., propellants, heat sources, etc.). The skilled person will be familiar with alternatives for both the arrangement and the type and properties of the additional material which can be used to fulfill the requirements in a concrete case.

DETAILED DESCRIPTION OF SPECIFIC EMBODIMENTS

Figure 1:
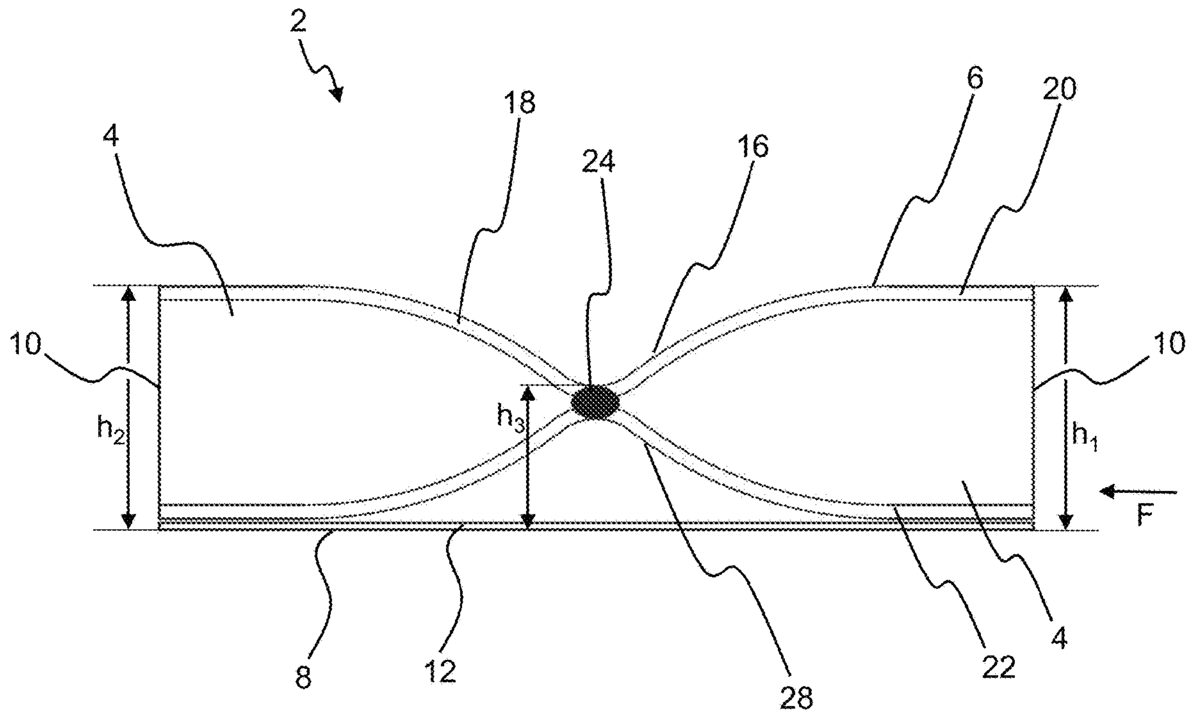
FIG. 1 is a schematic, cross-sectional view of a first embodiment of a sealing tape according to the invention in the fully expanded state.

A sealing tape 2 shown in cross section in FIG. 1 comprises a base body 4 of flexible foam, which is capable of recovering after being compressed, and which is preferably impregnated to delay its recovery. Base body 4 originally has a one-piece shape, but, as a result of a permanent compression and/or fusion of the material of base body 4, it is thinner in the middle area than in the areas to the right and to the left.

Sealing tape 2 illustrated here comprises a top surface 6, a bottom surface 8, and two side surfaces 10, which connect top surface 6 and bottom surface 8 to each other. Side surfaces 10 are substantially perpendicular to a functional direction F of the sealing tape, i.e., the direction in which the sealing tape, when in the later installed state (see FIG. 12), is intended to seal off a joint against the passage of air and/or against the diffusion of water vapor.

In the area of the bottom surface 8, an adhesive layer 12 is arranged, which, in the example shown here, is flat and serves to adhere the tape to a building component 14 (see FIG. 12) such as a frame profile of a window or door. Adhesive layer 12 is preferably configured as a double-sided adhesive tape and is adhered by its top surface to the adjacent areas of the sealing tape. The adhesive surface of adhesive layer 12 serving to adhere the sealing tape to building component 14 is oriented downward and is usually covered by a peel-off film or a peel-off paper, which can be removed before use. In the example shown here, it is also conceivable that adhesive layer 12 could be configured with adhesive properties in the upward direction only in the areas in which it comes into contact with areas of the sealing tape.

Top surface 6 of sealing tape 2 comprises a profile with a valley 16 in a middle area between side surfaces 10 of sealing tape 2. The interior space of valley 16 is filled exclusively with air. In the area of valley 16, top surface 6 of sealing tape 2 is curved. In the area of side surfaces 10, top surface 6 of sealing tape 2 is substantially flat. The interior space of valley 16 is defined as the space which is bounded by the curved part of top surface 6 and an extension of the substantially flat section of top surface 6 over valley 16.

Because of valley 16, which is filled only with air, sealing tape 2 offers the advantage over sealing tapes with a base body with a rectangular cross section that, because of the relatively large quantity of air present in the middle area of sealing tape 2, it has a greater thermal insulation effect. All of the other above-described embodiments of the sealing tape with at least one valley 16 in top surface 6 or bottom surface 8 also offer this advantage.

In the area of first (right) side surface 10, sealing tape 2 comprises, in the fully expanded state, a first thickness $h_1$, which corresponds to the thickness $h_2$ of second (left) side surface 10. At the vertex of valley 16, however, sealing tape 2, when in the fully expanded state, has a third thickness $h_3$, which is less than the first thickness $h_1$ and also less than the second thickness $h_2$. The reduced third thickness $h_3$ in the fully expanded state of sealing tape 2 is obtained to at least some extent by a permanent compression and/or fusion of the material of base body 4.

The bottom of base body 4 comprises a profile with a lower valley 28, which is oriented toward top surface 6 of sealing tape 2 and which, in the area of the third thickness $h_3$, is opposite valley 16 in top surface 6.

Sealing tape 2 shown in FIG. 1 also comprises a continuous barrier structure 18 for reducing the diffusion of water vapor and/or the permeability to air in functional direction F of sealing tape 2, which structure extends from top surface 6 to bottom surface 8, passing at least partially through the area of third thickness $h_3$.

In other embodiments, thickness $h_1$ can also be different from thickness $h_2$, as long as both thicknesses $h_1$, $h_2$ are greater than thickness $h_3$.

In the embodiment shown in FIG. 1, barrier structure 18 comprises several subsections, which together form continuous barrier structure 18. First, sealing tape 2 comprises, on top surface 6, a barrier layer 20. This barrier layer 20 extends from the first to the second side surface 10 and covers base body 4 of sealing tape 2 completely. Barrier layer 20 is preferably bonded to base body 4 with an adhesive or laminated to it. Barrier layer 20 on top surface 6 of sealing tape 2 comprises a closed-cell foam or consists of such foam. At least in the area of side surfaces 10, the flat sections of barrier layer 20 on top surface 6 which are intended to rest against the wall preferably comprise a closed-cell foam.

Sealing tape 2 also comprises an additional barrier layer 22 in the area of the bottom surface of base body 4, which barrier layer also extends from the first to the second side surface 10 and preferably covers the base body completely. Barrier layer 22 is preferably bonded permanently to the base body with an adhesive or is laminated to it. Barrier layers 20, 22 thus, form symmetrically configured boundaries of base body 4 on its top and bottom surfaces.

A third component of barrier structure 18 is the permanently compressed and/or fused section 24 of sealing tape 2 in the area of valley 16. In this area, barrier layer 20 arranged on top surface 6, barrier layer 22 arranged on bottom surface 8, and the material of base body 4 are jointly compressed and/or fused, as a result of which the reduced third thickness $h_3$ of sealing tape 2 is obtained. As a result of the compression and/or fusion of the various layers in this area, a seal-producing connection is produced between upper barrier layer 20 and lower barrier layer 22.

The compression and/or fusion can be achieved in this area by, for example, adhesive bonding after compression, by stitching, by lamination under simultaneous compression, or by partial melting (with or without compression). In all cases, the higher compression and/or the greater material density in the compressed/fused area ensures that, in this section 24, the sealing property of the sealing tape and/or the resistance to the diffusion of water vapor in the functional direction F is significantly increased. The material of the base body 4 can be compressed so strongly or fused to the materials of barrier layers 20, 22 in such a way that it can no longer be distinguished visually from barrier layers 20, 22.

Continuous barrier structure 18 formed by upper barrier layer 20, compressed/fused section 24, and lower barrier layer 22 thus extends over the entire thickness of the sealing tape (except for adhesive layer 12) and thus ensures a gap-free seal, adjusted to the desired degree, against the passage of air and/or the diffusion of water vapor over the entire thickness in functional direction F.

In this embodiment, barrier structure 18 begins from first and second side surfaces 10 and extends along top surface 6 of sealing tape 2 to the area in the middle between first and second side surfaces 10; it then proceeds from top surface 6 to bottom surface 8 of sealing tape 2 and extends along the bottom surface of base body 4 from the area in the middle between first and second side surfaces 10 to first and second side surfaces 10.

In this way, it is possible easily to produce a sealing tape with a continuous barrier structure 18 without the need for the laborious process of introducing a plurality of sealing tape components into cuts in the sealing tape.

In the embodiment shown, it is also conceivable that adhesive layer 12 would not have to extend continuously over the entire width of sealing tape 2 but instead could extend only in the form of strips in the areas in which it is to be adhered to the other elements of the sealing tape.

Figure 2:
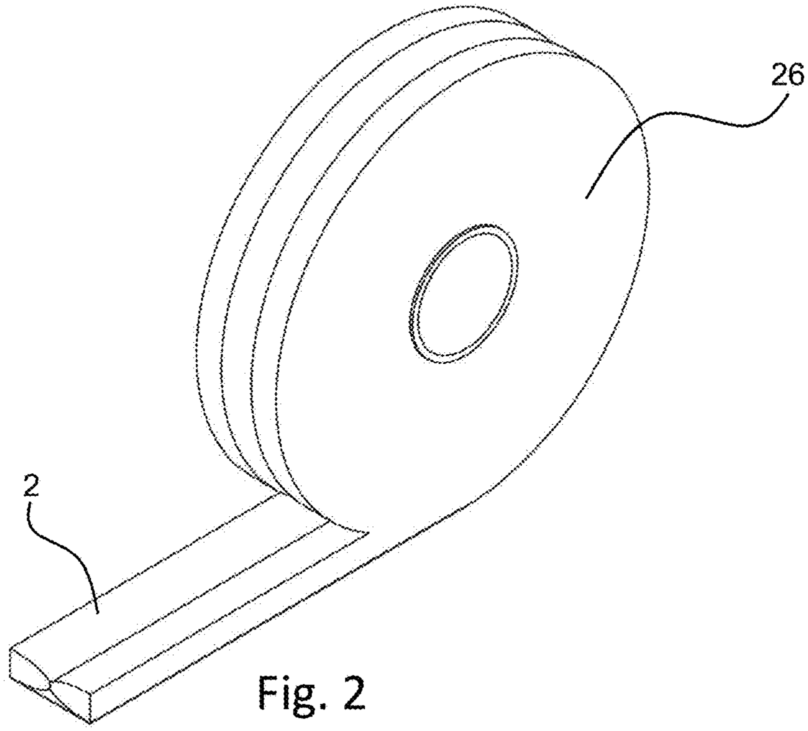
FIG. 2 is a schematic, perspective view of the sealing tape according to FIG. 1 after it has been wound up into a sealing tape roll.

In FIG. 2, sealing tape 2 according to FIG. 1 is shown in a configuration in which it has been wound up into a sealing tape roll 26. Sealing tape 2 is now in a (partially) compressed state, in which top surface 6 and bottom surface 8 of the sealing tape form substantially a straight line, or in which valley 16 is much less pronounced than it is in the fully expanded state. The configuration as a sealing tape roll 26 is also preferred for all of the additional embodiments of the sealing tape according to the invention, and the same relationships pertain.

Figure 3:
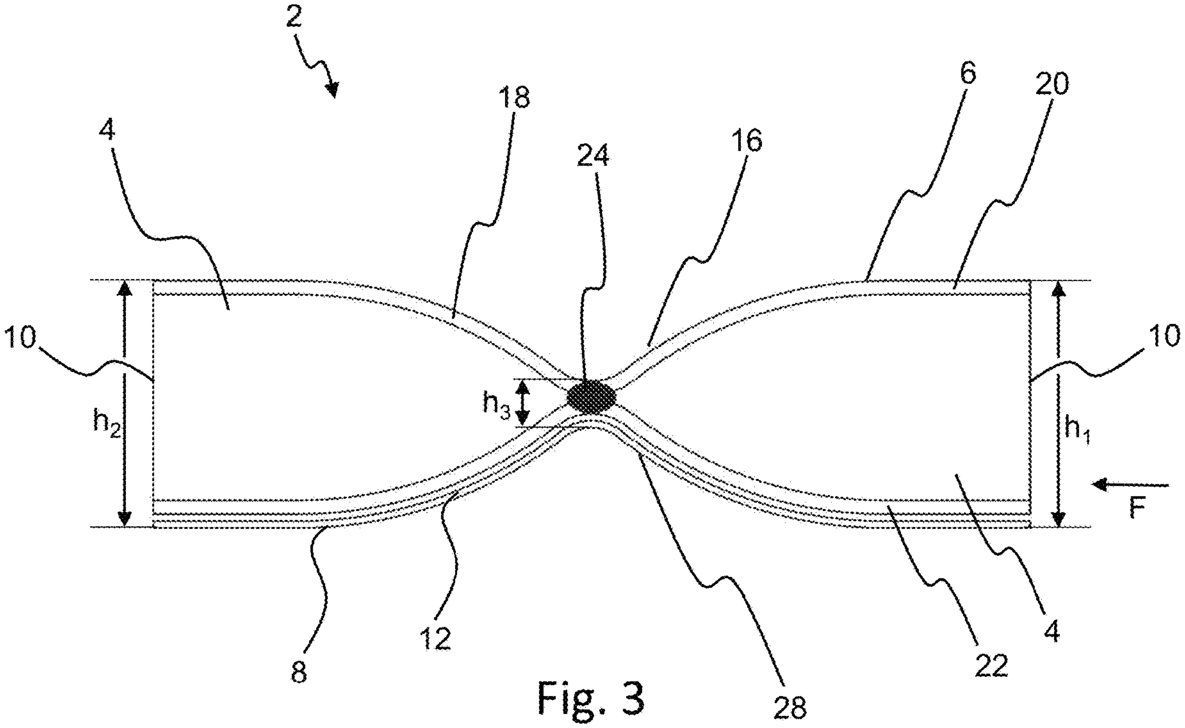
FIG. 3 is a schematic, cross-sectional view of a second embodiment of the sealing tape according to the invention in a fully expanded state.

The sealing tape shown in FIG. 3 differs from the sealing tape of FIG. 1 in that adhesive layer 12 adheres continuously to lower barrier layer 22 and thus has a profile in the form of a hill, which corresponds to the profile of the bottom surface of the base body with lower valley 28.

In the embodiment shown in FIG. 3, only upper barrier layer 20, base body 4, and lower barrier layer 22 are compressed or fused together in the area of compressed/fused section 24, whereas adhesive layer 12 is applied afterwards as a separate strip to sealing tape 2. It is also conceivable that adhesive layer 12 could become a component of compressed/fused section 24 and that it is also compressed and/or fused with the other components of sealing tape 2 present in this area. In this case, the compression/fusion is not carried out until after adhesive layer 12 has been applied.

Adhesive layer 12 can contribute additionally to barrier structure 18. It is also conceivable that, in the embodiment according to FIG. 3, lower barrier layer 22 could be omitted, in which case adhesive layer 12 takes over the function of the lower barrier layer. It must then be ensured that adhesive layer 12 has properties which reduce the passage of air or the diffusion of water vapor to the desired degree. In this case, barrier structure 18 would be formed by upper barrier layer 20, compressed/fused section 24, and adhesive layer 12.

Also in the embodiment according to FIG. 3, barrier structure 18 extends along top surface 6 of sealing tape 2, beginning from first and second side surfaces 10 and proceeding to the area between first and second side surfaces 10, from which it then proceeds from top surface 6 to bottom surface 8 of sealing tape 2 and then along the bottom surface of the base body from the area between first and second side surfaces 10 to first and second side surfaces 10.

Figure 4:
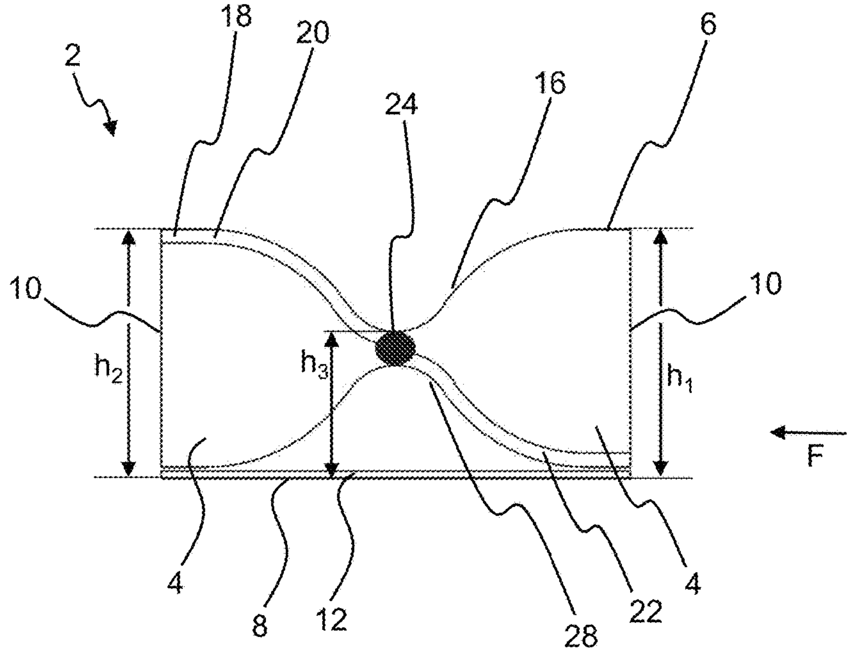
FIG. 4 is a schematic, cross-sectional view of another embodiment of the sealing tape according to the invention in a fully expanded state.

The embodiment of sealing tape 2 according to the invention shown in FIG. 4 differs from the embodiment of FIG. 1 in that upper barrier layer 20 extends only from one side surface 10 to compressed/fused section 24, and that lower barrier layer 22 also extends only from compressed/fused section 24 to one of side surfaces 10, preferably to side surface 10 of the sealing tape other than that from which upper barrier layer 20 extends. This configuration is sufficient to form a continuous barrier structure 18, which is composed of upper barrier layer 20, compressed/fused section 24, and lower barrier layer 22. In this exemplary embodiment, at least upper barrier layer 20 comprises a closed-cell foam for contact with a wall.

Formulated in general terms, barrier structure 18, in the embodiment shown here, extends along top surface 6 from second side surface 10 (on the left) to the area between first and second side surfaces 10, from which it then proceeds from top surface 6 to bottom surface 8 of sealing tape 2 and along the bottom surface of at least one base body 4 from the area between first and second side surfaces 10 to first side surface 10 (on the right). It is obvious that barrier structure 18 can also extend in a corresponding manner along top surface 6 from first side surface 10 and along the bottom surface of at least one base body 4 to second side surface 10.

Alternatively, barrier structure 18 on top surface 6 extends from first side surface 10 to the area between first and second side surfaces 10, from which it then proceeds from top surface 6 to bottom surface 8 of the sealing tape and along the bottom surface of the at least one base body from the area between first and second side surfaces 10 to first side surface 10.

Because the entire thickness of sealing tape 2 is covered over its complete cross section by these components, it is ensured that the air permeability or water vapor diffusion in functional direction F of the sealing tape can be reduced to the desired degree.

It is also possible for only one of two barrier layers 20, 22 to extend between a side surface 10 and section 24 and for the other one of two barrier layers 20, 22 to extend all the way between the two side surfaces 10.

Figure 5:
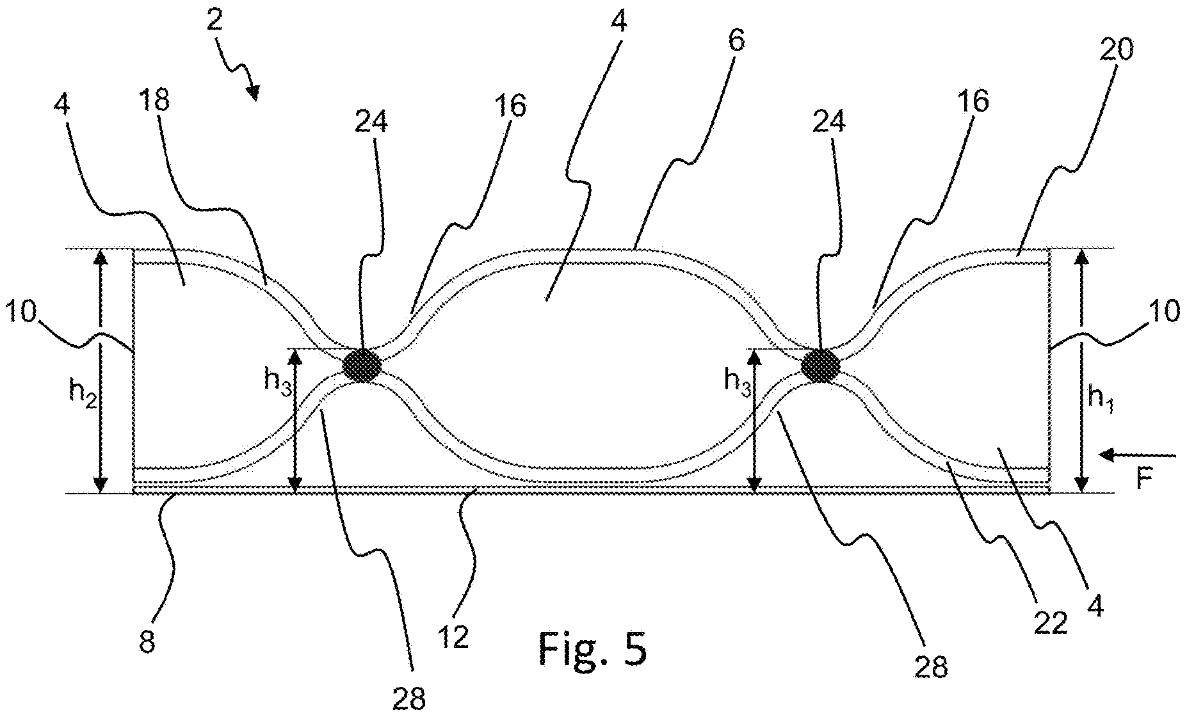
FIG. 5 is a schematic, cross-sectional view of another embodiment of the sealing tape according to the invention in a fully expanded state.

The embodiment of sealing tape 2 shown in FIG. 5 differs from the embodiment of FIG. 1 in that two compressed/fused sections 24 are provided across the width of sealing tape 2. Between these sections 24, an area of the base body with a substantially oval cross section is arranged, which is preferably surrounded on the top and bottom surfaces by barrier layers 20, 22.

It is also possible for more than two compressed/fused sections 24 to be provided across the width of the sealing tape. It is also conceivable in all of the embodiments that compressed/fused section or sections 24 could be arranged asymmetrically across the width of the sealing tape.

Barrier structure 18 in the embodiment according to FIG. 5 is formed by upper barrier layer 20, lower barrier layer 22 (which can be replaced, optionally, by adhesive layer 12), and sections 24. Alternatively, barrier structure 18, in a sealing tape 2 configured in this way, can also be formed only by sections of barrier layers 20, 22 as shown in FIG. 4.

Figure 6:
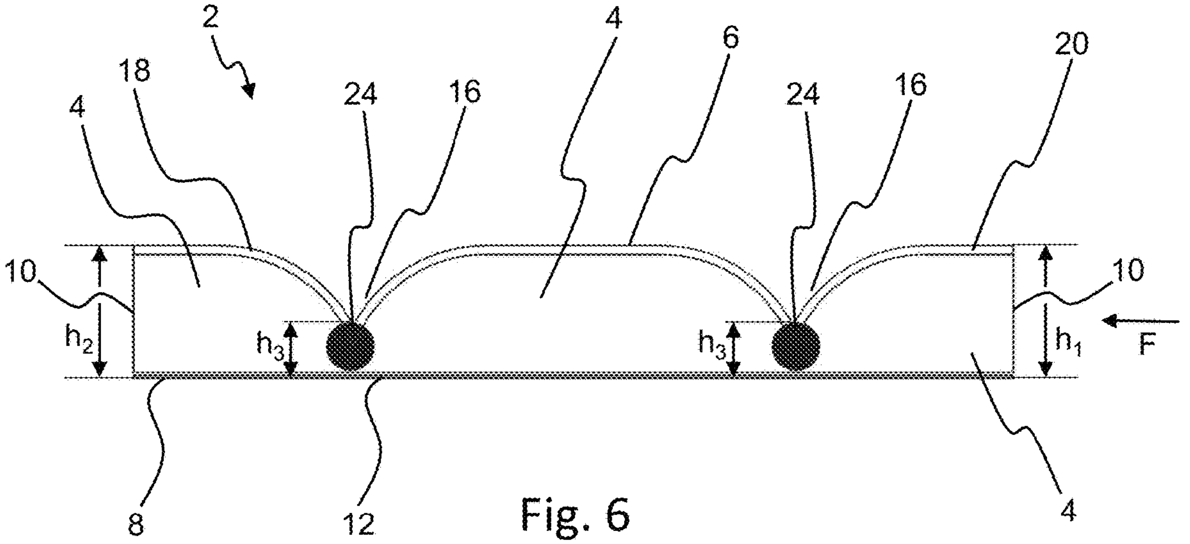
FIG. 6 is a schematic, cross-sectional view of another embodiment of the sealing tape according to the invention in a fully expanded state.

The embodiment of sealing tape 2 according to the invention shown in FIG. 6 differs from the embodiment of FIG. 5 in that the bottom of base body 4 is substantially flat and is adhered over its entire surface to adhesive layer 12. In addition, the shape of valleys 16 can be substantially V-shaped, and compressed/fused sections 24 are located, with respect to the thickness of the sealing tape, not in a middle area of the sealing tape but rather in a lower area of the sealing tape. Such modifications of valley 16 or of compressed/fused section 24 are also conceivable in all of the other embodiments previously described. In the embodiment according to FIG. 6, furthermore, the shape of valleys 16 can also correspond to the shape in the other embodiments, e.g., to those according to FIGS. 1 and 3-5.

In the example shown here, furthermore, lower barrier layer 22 is omitted; but it could also be added in the case of the exemplary embodiment of FIG. 6. As an option, adhesive layer 12 can take over this function.

Figure 7:
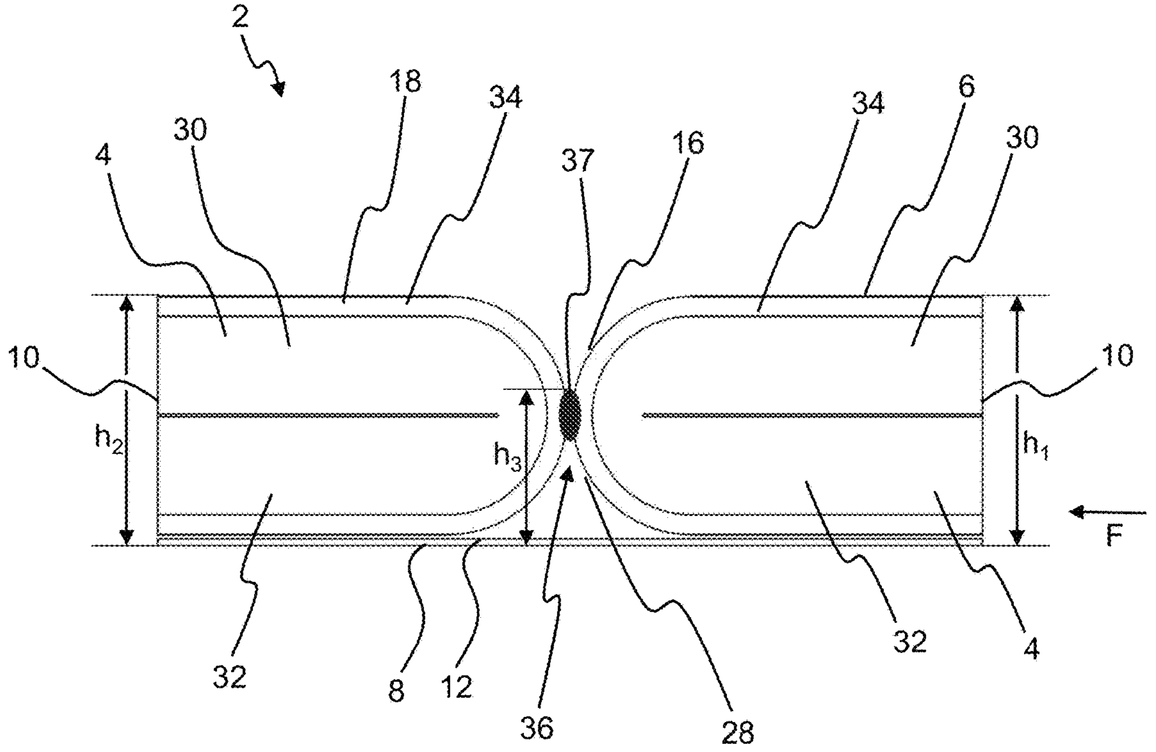
FIG. 7 is a schematic, cross-sectional view of another embodiment of the sealing tape according to the invention in a fully expanded state.

The embodiment of sealing tape 2 according to the invention shown in FIG. 7 comprises two base bodies 4 of flexible foam capable of recovery after compression, which base bodies are preferably impregnated to delay their recovery and which are arranged next to each other in functional direction F of sealing tape 2.

Sealing tape 2 comprises a top surface 6, a bottom surface 8, and two side surfaces 10, which connect top surface 6 and bottom surface 8 to each other. Side surfaces 10 are substantially perpendicular to a functional direction F of the sealing tape 2, i.e., the direction in which sealing tape 2, when in the installed state to be produced later, is intended to seal a joint against the passage of air and/or the diffusion of water vapor.

In the area of bottom surface 8, an adhesive layer 12 is arranged, which, in the example shown here, is flat and serves to adhere the sealing tape to a building component 14 (see FIGS. 12, 13), such as a frame profile of a window or door. Adhesive layer 12 is preferably configured as a double-sided adhesive tape and adheres by its top surface to the adjacent areas of the sealing tape. The adhesive surface of adhesive layer 12 serving to attach the sealing tape to the building component is oriented downward, i.e., facing away from the other components of sealing tape 2, and is usually covered by a peel-off film or a peel-off paper, which can be removed before use. In the example shown here, it is also conceivable that adhesive layer 12 could be configured so that it has adhesive properties only in the areas in which it comes in contact with areas of the sealing tape.

Top surface 6 of sealing tape 2 comprises a profile with a valley 16 in a middle area of sealing tape 2. The interior space of valley 16 is filled exclusively with air. In the area of first side surface 10 (on the right), sealing tape 2, when in the fully expanded state, comprises a first thickness $h_1$, which corresponds to thickness $h_2$ of second side surface 10 (on the left). At the vertex of valley 16, however, sealing tape 2, when in the fully expanded state, has a third thickness $h_3$, which is less than first thickness $h_1$ and also less than second thickness $h_2$.

The area with third thickness $h_3$ is formed in a transition area 36 between two base bodies 4. In the example shown here, each of two base bodies 4 is obtained by bending a molded body with an originally rectangular cross section, wherein a first or upper leg 30 of base body 4 is bent over by 180° with respect to a second or lower leg 32 of base body 4. The bending site is arranged in the area 36 of the transition to the other base body 4; and, as a result of the bending process, the foam material of base body 4 is compressed into itself in the area of the bending site.

First and second legs 30, 32 can be adhered to each other at their facing surfaces; they are preferably bonded together by an adhesive or laminated to each other. As a result, a substantially horizontal adhesion surface is obtained between legs 30, 32.

Each of two base bodies 4 comprises a covering 34, which surrounds it on the top surface, the bottom surface, and the side facing the other base body 4. Depending on the stiffness of this covering 34, covering 34 can in each case contribute additionally to the compression of the material of base body 4 in the area of the bending site. Adhesive layer 12 is adhered permanently to two coverings 34 along their bottom surface.

It is preferred that covering 34 form a barrier structure 18, which fulfills the same requirements as barrier structure 18 described previously on the basis of FIG. 1. It is even more preferable for covering 34 of at least one base body to be formed out of closed-cell foam, so that the best-possible contact with the wall can be easily achieved in the area of top surface 6 of sealing tape 2.

Each covering 34 forms its own continuous barrier structure 18, which, considered across the width of sealing tape 2, covers the entire thickness of sealing tape 2 and is thus, able to reduce the air permeability or the passage of water vapor in functional direction F to the desired degree. Barrier structure 18 thus extends along top surface 6 at least from one of the side surfaces, i.e., either the first or second side surface, through transition area 36, and along the bottom surface of the same base body back to same side surface 10, i.e., the first or second.

The two adjacent base bodies in the present case are permanently adhered together, e.g., by an adhesive layer 37, in transition area 36 via the intermediate presence of the associated sections of coverings 34. Coverings 34 of two base bodies 4, however, can also be fused directly together. An adhesive layer 37 of this type or the adhesive bonding of coverings 34 can also contribute to barrier structure 18.

The end result is that, in the area of the reduced third thickness $h_3$, a substantially V-shaped valley 16 is formed in the area of top surface 6 of the sealing tape, and an additional V-shaped valley 28 is formed in the area of bottom surface 8 of the sealing tape, opposite valley 16.

Figure 8:
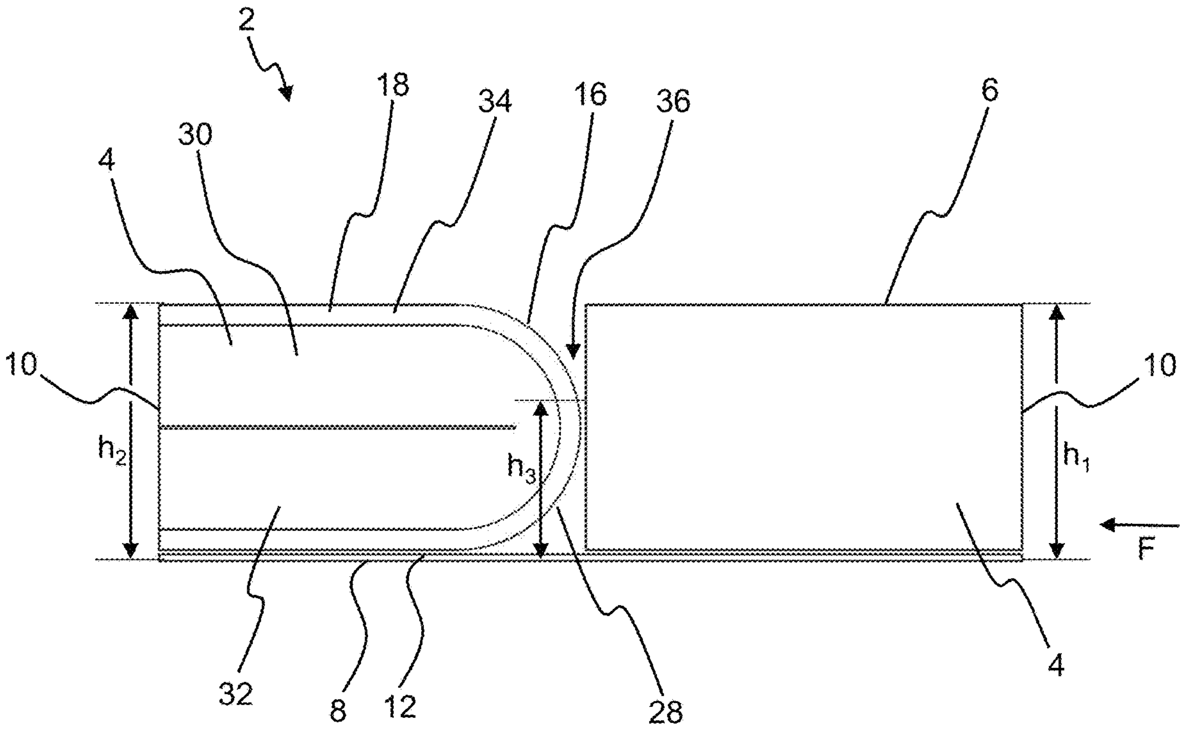
FIG. 8 is a schematic, cross-sectional view of another embodiment of the sealing tape according to the invention in a fully expanded state.

The embodiment of sealing tape 2 according to the invention shown in FIG. 8 differs from the embodiment of FIG. 7 in that only one of base bodies 4 corresponds to one of two base bodies 4 of FIG. 7. The other base body 4 is also a base body of flexible foam, but it represents a pre-cut part with a rectangular cross section. The pre-cut part can also have some other geometric shape.

The continuous barrier structure 18 is formed in this case only by covering 34 of first base body 4. In transition area 36, the two base bodies 4 merely rest against each other, but they can also be adhered to each other, as described on the basis of FIG. 7.

The thicknesses of the two base bodies 4 are preferably the same, but they can also be different; this can be the case when, for example, one of two base bodies 4 has a covering 34 and thickness $h_1$ should nevertheless be equal to thickness $h_2$. In transition area 36, it is preferred that third thickness $h_3$ be less than that in the area of each of two side surfaces 10 of sealing tape 2. The arrangement of two base bodies 4 with respect to functional direction F in FIG. 8 can also be reversed. It is also conceivable that, on the side of the free lateral surface of rectangular base body 4, an additional base body 4 with a covering 34 could be arranged, preferably a mirror image of base body 4 in FIG. 8 already described.

Figure 9:
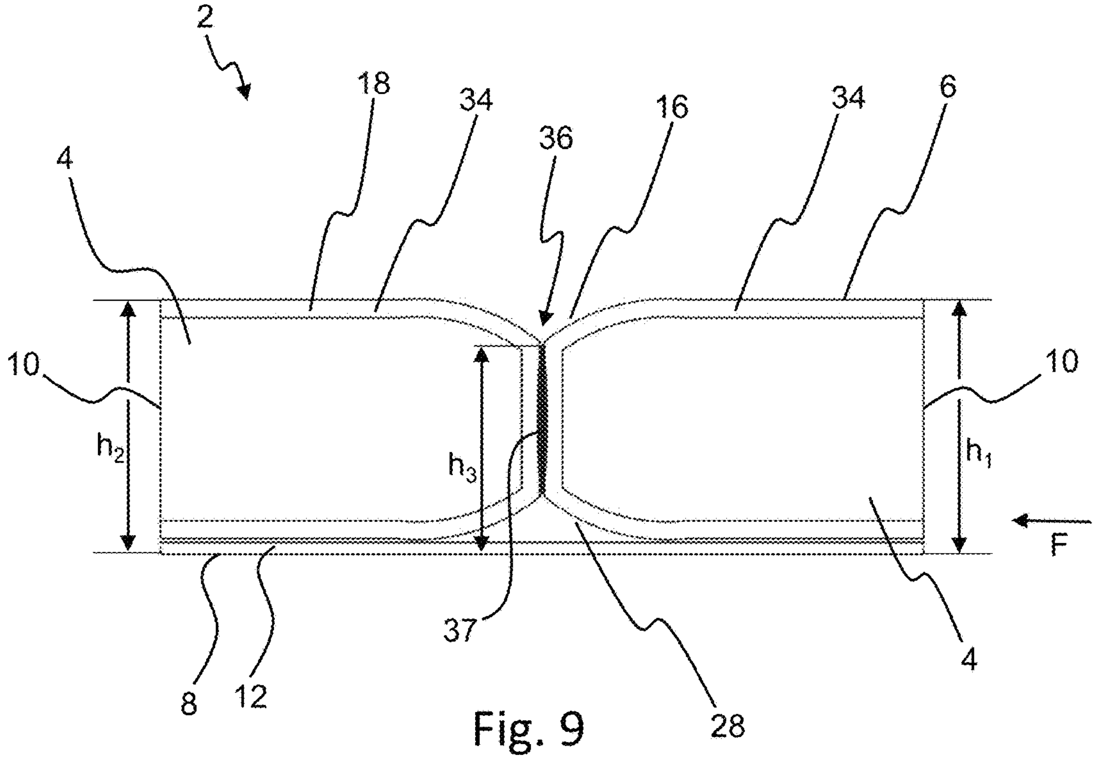
FIG. 9 is a schematic, cross-sectional view of another embodiment of the sealing tape according to the invention in a fully expanded state.

The embodiment of sealing tape 2 according to FIG. 9 differs from the embodiment of FIG. 7 in that each of two base bodies 4 consists of a pre-cut part with a rectangular cross section and are not bent over. The compression of two base bodies 4 near transition area 36 is therefore obtained exclusively by the adhesion of two coverings 34 in transition area 36 and by the stiffness of coverings 34. To form valley 16 and possibly valley 28, it is then essential that adhesive layer 37 between coverings 34 have a lesser thickness than first or second thickness $h_1$, $h_2$ at side surfaces 10 of the sealing tape. Because of the stiffness of covering 34, each base body 4 will then be more highly compressed near transition area 36 than it is in the area of side surface 10 when fully expanded. In this embodiment as well, barrier structure 18 is formed by at least one covering 34 and possibly by adhesive layer 37 also.

It is also possible to combine a base body configured as in FIG. 9 with a conventional base body 4 with a rectangular cross section without a covering 34.

Figure 10:
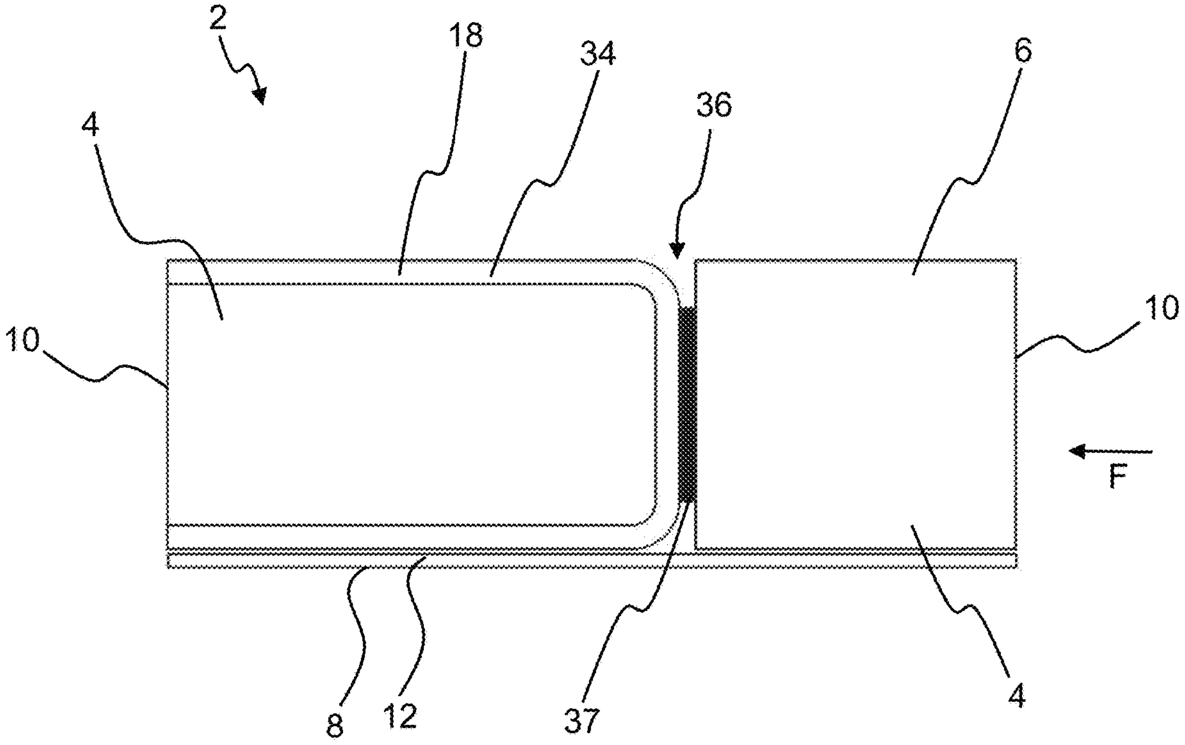
FIG. 10 is a schematic, cross-sectional view of another embodiment of the sealing tape according to the invention in a fully expanded state.

The embodiment of sealing tape 2 according to FIG. 10 differs from the embodiment of FIG. 8 in that each of the two base bodies consists of a pre-cut part with a rectangular cross section and is not bent over. The one base body 4 (on the left in FIG. 10) corresponds substantially to one of two base bodies 4 according to FIG. 9 and comprises a covering 34, which forms at least part of barrier structure 18. The other base body 4 (on the right in FIG. 10) corresponds substantially to the pre-cut part of flexible foam with a rectangular cross section according to FIG. 8, but it can also have some other geometric shape. Two base bodies 4 can be permanently bonded to each other in transition area 36 by, for example, an adhesive layer 37. Two base bodies 4, however, can also be connected to each other only by adhesive layer 12 in the area of their associated bottom surfaces.

In contrast to FIG. 9, covering 34 or its adhesion to other base body 4 in this case produces no significant compression of base body 4 in or near transition area 36. Correspondingly, no significant valleys 16, 28 are formed in the top and bottom surfaces of sealing tape 2. As a result, the goal is achieved that sealing tape 2, when in the installed state, rests as completely as possible over its entire width against a building component 14 and the wall. The pressure exerted by sealing tape 2 on the wall is then substantially constant over the width of sealing tape 2.

To increase the sealing action of sealing tape 2, however, at least the wrapped base body 4 in this embodiment can also be compressed to any desired degree, as previously described in connection with the other embodiments, this compression being achieved, for example, by covering 34.

Figure 11:
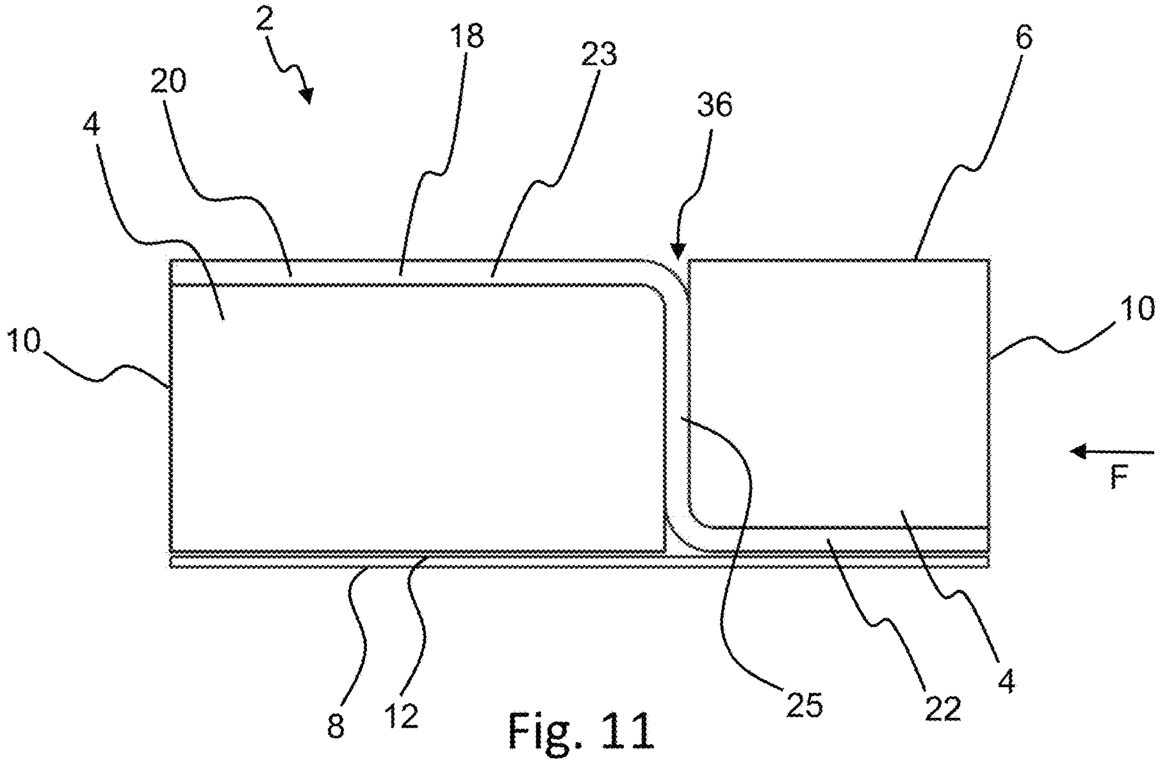
FIG. 11 is a schematic, cross-sectional view of another embodiment of the sealing tape according to the invention in a fully expanded state.

Sealing tape 2 according to the invention shown in FIG. 11 comprises two substantially rectangular base bodies 4 of flexible foam. Barrier structure 18 in this case is formed as a continuous, preferably one-piece barrier layer 23, which extends along top surface 6 of sealing tape 2, proceeds from top surface 6 to bottom surface 8 of sealing tape 2, and then extends along the bottom surface of at least one of the two base bodies. Here barrier structure 18 or barrier layer 23 begins from second side surface 10 (on the left), proceeds along top surface 6 of sealing tape 2 and then along the facing side surfaces of base bodies 4 in transition area 36, from which it then proceeds to bottom surface 8 of sealing tape 2, where it extends along the bottom surface of one base body 4 to first side surface 10 (on the right). It is obvious that barrier structure 18 could also begin from first side surface 10, extend along top surface 6 and then proceed along bottom surface 8 to second side surface 10.

Continuous barrier layer 23 can be formed in part by a barrier layer 20 on top surface 6 of sealing tape 2 and in part by a barrier layer 22 on the bottom surface of at least one base body 4, as described on the basis of FIGS. 1 and 3-5. Barrier layers 20, 22 can extend either only from one of two side surfaces 10 to transition area 36 or over the entire width of sealing tape 2.

In transition area 36, another barrier layer section 25 is provided, which bonds two barrier layers 20, 22 to each other. Barrier layer section 25 along the facing side surfaces of base bodies 4 is preferably substantially parallel to side surfaces 10 and can be adhered to at least one of two base bodies 4, preferably to both base bodies 4.

Barrier layer section 25 can be formed as an integral part of barrier layers 20, 22 and can preferably be made of the same material as they are. Barrier layer section 25, however, can also be made of a different material, such as a film or an adhesive layer, or it can be formed by the fusion of the foam of one of the two base bodies to the corresponding side surface of the other base body. Barrier layers 20, 22 and barrier layer section 25 should then be bonded together to produce the seal.

In general, continuous barrier layer 23 and barrier layer section 25 can, within the scope of the invention, have the same properties and be made of the same materials as those described herein for barrier layers 20, 22 and covering 34. At least upper barrier layer 20 in this case comprises a closed-cell foam.

Two base bodies 4 can be bonded together by barrier layer section 25, e.g., bonded by an adhesive or laminated together. Alternatively, base bodies 4 can merely hold barrier layer section 25 loosely between them and be bonded permanently together by adhesive layer 12. Adhesive layer 12 can also take over the function of lower barrier layer 22, which can then be omitted accordingly.

In the embodiments according to FIGS. 7-11, more than two base bodies 4 can also be arranged next to each other appropriately and bonded together in each case.

There are many different possible ways of combining or modifying the individual embodiments. All such combinations are intended to be disclosed herewith to the extent that they fall under the attached claims.

Figure 12:
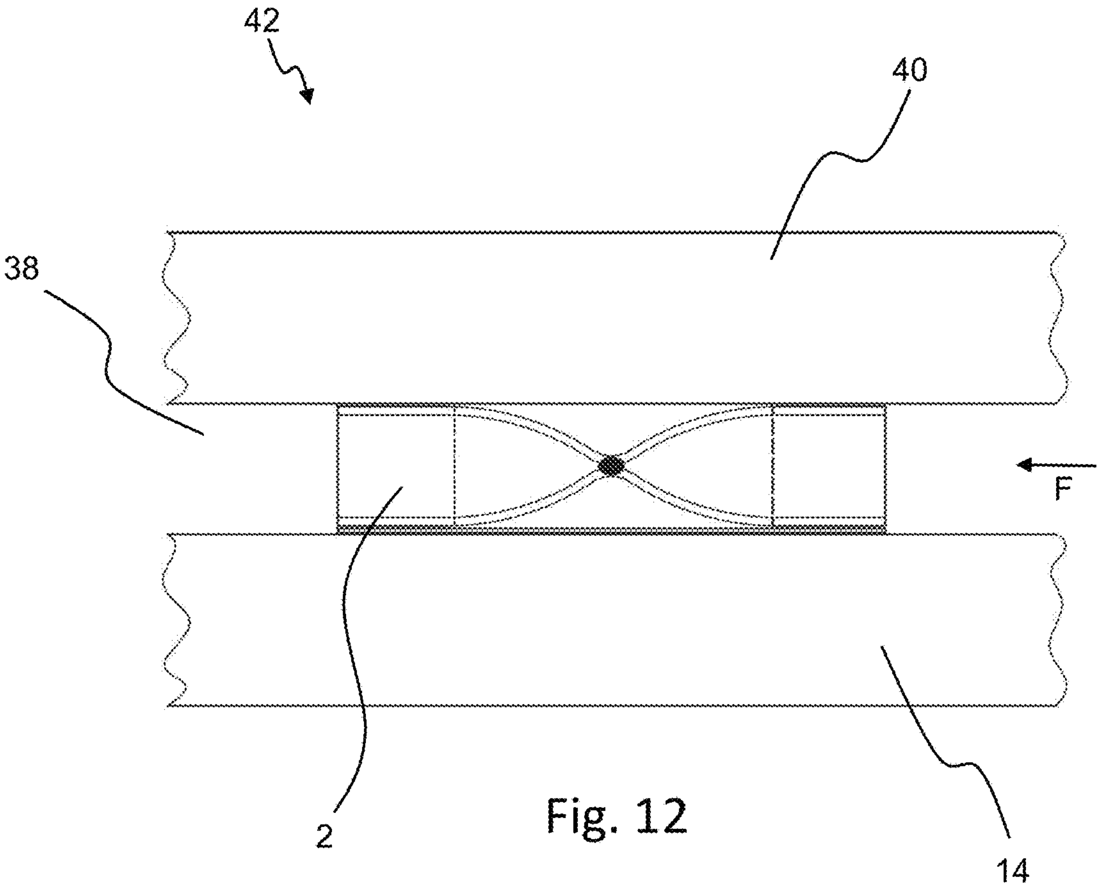
FIG. 12 is a schematic, cross-sectional view of an installation situation of the sealing tape according to FIG. 1, in which the sealing tape, in a partially compressed installation state, is arranged in a joint between a structural component and a wall with a sealing action.

FIG. 12 shows sealing tape 2 of FIG. 1 in an installed state. In a section 42 of a building, sealing tape 2 is arranged in a joint 38 in a partially compressed installation state between a building component 14, especially a frame profile of a window or door, and a wall 40 and thus seals joint 38. Top surface 6 of sealing tape 2 rests against wall 40. In the area of top surface 6, sealing tape 2 comprises a barrier structure 18, i.e., in this exemplary embodiment upper barrier layer 20, at least certain parts of which rest against wall 40. Because barrier structure 18 comprises a closed-cell foam in the area of the top surface of sealing tape 2 or consists of such foam, the best-possible conformity of the top surface of sealing tape 2 to the rough surface of the wall is guaranteed.

As indicated by the broken lines, top surface 6 of sealing tape 2 rests against wall 40 in the area of side surfaces 10 of the sealing tape, whereas, at least in the area of original third thickness $h_3$ and in the adjacent areas (between the broken lines), top surface 6 does not rest against wall 40. It is also conceivable, however, that third thickness $h_3$ could be considerably greater and that top surface 6 of the sealing tape could thus also rest against wall 40 in the area of original third thickness $h_3$, in which case, however, the pressure exerted here will be less than that present in the area of side surfaces 10 of the sealing tape.

Figure 13:
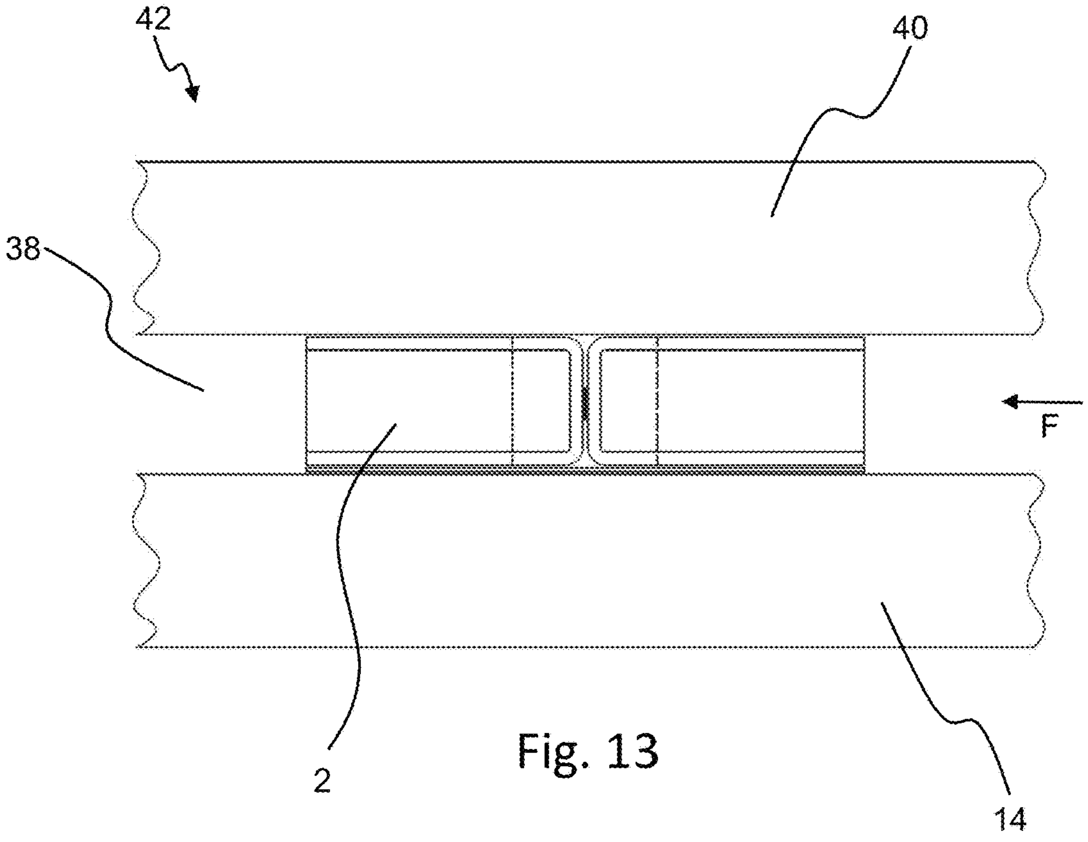
FIG. 13 is a schematic, cross-sectional view of an installation situation of the sealing tape according to FIG. 9, in which the sealing tape, in a partially compressed installation state, is arranged in a joint between a structural component and a wall with a sealing action.

FIG. 13 shows sealing tape 2 of FIG. 9 in a corresponding installation situation. In this case, sealing tape 2 is compressed between building component 14 and wall 40 in section 42 of the building to such a pronounced degree that top surface 6 rests against wall 40 even in the area of the original third thickness $h_3$ as well as in the adjacent areas (between the broken lines), although the pressure exerted on the wall is less here than in the area of side surfaces 10 of the sealing tape.

If, however, base bodies 4 of sealing tape 2 shown in FIG. 13 are configured like covered base bodies 4 according to FIG. 10 or if, instead of the illustrated sealing tape 2, sealing tape 2 according to FIG. 10 is used, top surface 6 of the sealing tape will rest against wall 40 substantially over the entire width of sealing tape 2. The pressure exerted by sealing tape 2 on the wall will then be substantially constant over the entire width. A deviation, however, can occur in transition area 36, but it will be negligible because of the small dimensions of adhesion layer 36 or similar materials.

The invention claimed is:

1. A sealing tape comprising at least two base bodies of flexible foam capable of recovery after compression, wherein the sealing tape comprises a top surface, a bottom surface, and first and second side surfaces, which connect the top surface and the bottom surface to each other, wherein the side surfaces are substantially perpendicular to a functional direction of the sealing tape;

wherein an adhesive layer for bonding to a frame profile of a window or door is arranged in an area of the bottom surface;

wherein the sealing tape comprises a continuous barrier structure for reducing the permeability to the diffusion of water vapor and/or the permeability to air in the functional direction;

wherein the barrier structure extends from the top surface to a bottom surface of the sealing tape;

wherein the at least two base bodies are arranged next to each other in the functional direction of the sealing tape, wherein, in a transition area between the two adjacent base bodies, the barrier structure extends from the top surface to the bottom surface of the sealing tape, and wherein the two base bodies are adhered permanently to each other in the transition area by the barrier structure or an additional adhesive layer between the base bodies;

wherein the barrier structure also extends over an area of the top surface of the sealing tape and, at least in the area of the top surface of the sealing tape, comprises closed-cell flexible foam or is made of closed-cell flexible foam.

2. The sealing tape according to claim 1 wherein the barrier structure on the top surface of the sealing tape extends over at least 10% of the width of the sealing tape.

3. The sealing tape according to claim 1 wherein the barrier structure on the top surface of the sealing tape extends over the entire width of the sealing tape.

4. The sealing tape according to claim 1 wherein the closed-cell flexible foam of the barrier structure is made of polyurethane, polyethylene, polyvinyl chloride, polyolefin, or polypropylene and has a density of between 15 and 200 $kg/m^3$.

5. The sealing tape according to claim 1 wherein the closed-cell flexible foam of the barrier structure has a compression hardness of between 2 kPa and 15 kPa, based on a compression of 40% versus the original thickness (CV40) according to DIN EN ISO 3386:2015.

6. The sealing tape according to claim 1 wherein the closed-cell flexible foam of the barrier structure has an air permeability of no more than 50 $l/(m^2s)$ measured according to DIN EN ISO 9237:1995 for a test area of 100 $cm^2$ at a measurement pressure (negative pressure) of 1.0 mbar by the use of a model 21443 Frank test device.

7. The sealing tape according to claim 1 wherein the closed-cell flexible foam of the barrier structure has an air permeability of no more than 40 $l/(m^2s)$ measured according to DIN EN ISO 9237:1995 for a test area of 100 $cm^2$ at a measurement pressure (negative pressure) of 1.0 mbar by the use of a model 21443 Frank test device.

8. The sealing tape according to claim 1 wherein the closed-cell flexible foam of the barrier structure has an air permeability of no more than 30 $l/(m^2s)$ measured according to DIN EN ISO 9237:1995 for a test area of 100 $cm^2$ at a measurement pressure (negative pressure) of 1.0 mbar by the use of a model 21443 Frank test device.

9. The sealing tape according to claim 1 wherein the closed-cell flexible foam of the barrier structure has an air permeability of no more than 20 $l/(m^2s)$ measured according to DIN EN ISO 9237:1995 for a test area of 100 $cm^2$ at a measurement pressure (negative pressure) of 1.0 mbar by the use of a model 21443 Frank test device.

10. The sealing tape according to claim 1, wherein the barrier structure, in the area of the top surface of the sealing tape, has a thickness of between 10 μm and 5 mm.

11. The sealing tape according to claim 1, wherein the barrier structure, in the area of the top surface of the sealing tape, has a thickness of between 15 μm and 3 mm.

12. The sealing tape according to claim 1, wherein the barrier structure, in the area of the top surface of the sealing tape, has a thickness of between 50 μm and 2 mm.

13. A sealing tape roll comprising a sealing tape wound up into a roll, wherein the sealing tape comprises at least two base bodies of flexible foam capable of recovery after compression, wherein the sealing tape comprises a top surface, a bottom surface, and first and second side surfaces, which connect the top surface and the bottom surface to each other, wherein the side surfaces are substantially perpendicular to a functional direction of the sealing tape;

wherein an adhesive layer for bonding to a frame profile of a window or door is arranged in an area of the bottom surface;

wherein the sealing tape comprises a continuous barrier structure for reducing the permeability to the diffusion of water vapor and/or the permeability to air in the functional direction;

wherein the barrier structure extends from the top surface to a bottom surface of the sealing tape;

wherein the at least two base bodies are arranged next to each other in the functional direction of the sealing tape, wherein, in a transition area between the two adjacent base bodies, the barrier structure extends from the top surface to the bottom surface of the sealing tape, and wherein the two base bodies are adhered permanently to each other in the transition area by the barrier structure or an additional adhesive layer between the base bodies;

wherein the barrier structure also extends over an area of the top surface of the sealing tape and, at least in the area of the top surface of the sealing tape, comprises closed-cell flexible foam or is made of closed-cell flexible foam; and wherein the sealing tape in the sealing tape roll is in a compressed state in which the top surface and the bottom surface of the sealing tape extend in a substantially straight line.

14. A building section comprising a wall and a building component inserted into an opening in the wall, wherein a sealing tape in a partially compressed installation state is arranged in a joint between the building component and the wall and seals the joint, wherein the sealing tape comprises at least two base bodies of flexible foam capable of recovery after compression, wherein the sealing tape comprises a top surface, a bottom surface, and first and second side surfaces, which connect the top surface and the bottom surface to each other, wherein the side surfaces are substantially perpendicular to a functional direction of the sealing tape;

wherein an adhesive layer for bonding to a frame profile of a window or door is arranged in an area of the bottom surface;

wherein the sealing tape comprises a continuous barrier structure for reducing the permeability to the diffusion of water vapor and/or the permeability to air in the functional direction;

wherein the barrier structure extends from the top surface to a bottom surface of the sealing tape;

wherein the at least two base bodies are arranged next to each other in the functional direction of the sealing tape, wherein, in a transition area between the two adjacent base bodies, the barrier structure extends from the top surface to the bottom surface of the sealing tape, and wherein the two base bodies are adhered permanently to each other in the transition area by the barrier structure or an additional adhesive layer between the base bodies;

wherein the barrier structure also extends over an area of the top surface of the sealing tape and, at least in the area of the top surface of the sealing tape, comprises closed-cell flexible foam or is made of closed-cell flexible foam; and wherein, in the partially compressed installed state, the top surface of the sealing tape rests against the wall.

* * * * *